(12) United States Patent
Wang

(10) Patent No.: US 10,033,920 B2
(45) Date of Patent: Jul. 24, 2018

(54) METHOD FOR CONTROLLING CAMERAS, NON-TRANSITORY STORAGE MEDIUM AND TERMINAL

(71) Applicants: HISENSE MOBILE COMMUNICATIONS TECHNOLOGY CO., LTD., Shandong (CN); HISENSE USA CORPORATION, Suwanee, GA (US); HISENSE INTERNATIONAL CO., LTD., Shandong (CN)

(72) Inventor: Yongqing Wang, Shandong (CN)

(73) Assignees: Hisense Mobile Communications Technology Co., Ltd., Shandong (CN); Hisense USA Corporation, Suwanee, GA (US); Hisense International Co., Ltd., Shandong (CN)

( * ) Notice: Subject to any disclaimer, the term of this patent is extended or adjusted under 35 U.S.C. 154(b) by 0 days.

(21) Appl. No.: 15/085,049

(22) Filed: Mar. 30, 2016

(65) Prior Publication Data

US 2017/0078561 A1 Mar. 16, 2017

(30) Foreign Application Priority Data

Sep. 11, 2015 (CN) .......................... 2015 1 0577873

(51) Int. Cl.
*H04N 5/225* (2006.01)
*H04N 5/232* (2006.01)
(Continued)

(52) U.S. Cl.
CPC ....... *H04N 5/23216* (2013.01); *G06F 1/3203* (2013.01); *H04N 5/23241* (2013.01);
(Continued)

(58) Field of Classification Search
CPC ............. H04N 5/23241; H04N 5/3698; H04N 1/00885; G06F 1/3203; G03B 2217/007; G09G 2330/021
(Continued)

(56) References Cited

U.S. PATENT DOCUMENTS 8,441,232 B2* 5/2013 Hayasaki ........... G01R 31/3682
320/132
2008/0067979 A1 3/2008 Hayasaki
(Continued)

FOREIGN PATENT DOCUMENTS

CN 101335787 A 12/2008
CN 103246335 A 8/2013
(Continued)

*Primary Examiner* — Ngoc-Yen Vu
(74) *Attorney, Agent, or Firm* — Hoffmann & Baron, LLP

(57) ABSTRACT

Some Embodiments of the application discloses a method and apparatus for controlling cameras, the method including: receiving a request message for selecting at least one camera; obtaining the current amount of remaining power in the terminal; determining whether the current amount of remaining power satisfies a predetermined condition; and if so, then obtaining first hardware parameter information of the first camera, and second hardware parameter information of the second camera, and selecting one or more of the cameras according to the first hardware parameter information and the second hardware parameter information.

15 Claims, 5 Drawing Sheets

(51) Int. Cl.
*H04N 5/247* (2006.01)
*G06F 1/32* (2006.01)
*H04N 5/235* (2006.01)
*H04N 1/00* (2006.01)
*H04N 5/369* (2011.01)

(52) U.S. Cl.
CPC ....... *H04N 5/247* (2013.01); *G03B 2217/007* (2013.01); *H04N 1/00885* (2013.01); *H04N 5/3698* (2013.01)

(58) Field of Classification Search
USPC .......................................................... 348/372
See application file for complete search history.

(56) References Cited

U.S. PATENT DOCUMENTS

| | | |
|---|---|---|
| 2014/0267631 A1 | 9/2014 | Powers et al. |
| 2015/0103135 A1* | 4/2015 | Zhou ...................... H04N 7/147 348/14.07 |
| 2016/0241784 A1* | 8/2016 | Baek ..................... G06F 1/3287 |
| 2016/0295195 A1* | 10/2016 | Thorn ................. H04N 5/23219 |
| 2017/0052566 A1* | 2/2017 | Ka ......................... G06F 3/0483 |

FOREIGN PATENT DOCUMENTS

| | | |
|---|---|---|
| CN | 104410785 A | 3/2015 |
| CN | 104811554 A | 7/2015 |

\* cited by examiner

Obtain the current amount of remaining power in a terminal upon reception of a request for enabling the dual cameras, and to determine whether the obtained amount of remaining power is below a preset threshold ⟋ 31

If the obtained amount of remaining power is below the preset threshold, and the terminal is in a low-power control mode, then fetch hardware parameter information of the dual cameras, and select and enable one of the dual cameras according to the fetched hardware parameter information; and if the obtained amount of remaining power is below the preset threshold, and the terminal is not in the low-power control mode, then enable both of the dual cameras ⟋ 32

Fig. 3

Receive the instruction sent by the user to instruct the smart phone to enter the low-power control mode ⟋ 41

Set the parameter, at the driver layer of the terminal and configured to indicate whether the terminal is in the low-power control mode, to the valid value; or set the flag, in the specified partition of the memory of the terminal and configured to indicate that the terminal is in the low-power control mode, to the valid value ⟋ 42

Fig. 4

METHOD FOR CONTROLLING CAMERAS, NON-TRANSITORY STORAGE MEDIUM AND TERMINAL

CROSS-REFERENCE TO RELATED APPLICATIONS

This application claims the benefit of Chinese Patent Application No. 201510577873.3, filed with the State Intellectual Property Office of People's Republic of China on Sep. 11, 2015 and entitled "Method and apparatus for controlling dual camera", which is hereby incorporated herein by reference in its entirety.

FIELD

The present application relates to the field of image communication and particularly to camera method for controlling cameras, storage medium and terminal.

BACKGROUND

More and more terminal devices are equipped with one or more cameras along with the development of image processing technologies, wherein one or more cameras may be one or more front-facing cameras, or one or more rear cameras, or a combination of one or more front-facing cameras and one or more rear cameras.

SUMMARY

Some embodiments of the application provide a method for controlling cameras, applicable to a terminal including at least a first camera and a second camera, the method including:
receiving a request message for selecting at least one camera;
obtaining the current amount of remaining power in the terminal;
determining whether the current amount of remaining power satisfies a predetermined condition; and
if so, then obtaining first hardware parameter information of the first camera, and second hardware parameter information of the second camera, and
selecting one or more of the cameras according to the first hardware parameter information and the second hardware parameter information.

Some embodiments of the application provide a terminal comprising cameras, comprising at least a first camera and a second camera, the terminal comprising:
a memory; and
one or more processors;
wherein computer readable program codes are stored in the memory, and the one or more processors are configured to execute the computer readable program codes to perform a process comprising:
receiving a request message for selecting at least one camera;
obtaining the current amount of remaining power in the terminal;
determining whether the current amount of remaining power satisfies a predetermined condition; and
if so, then obtaining first hardware parameter information of the first camera, and second hardware parameter information of the second camera, and
selecting one or more of the cameras according to the first hardware parameter information and the second hardware parameter information.

Some embodiments of the application provide a storage medium, storing computer readable program codes to be executed by one or more processors to perform a process comprising:
receiving a request message for selecting at least one camera;
obtaining the current amount of remaining power in the terminal;
determining whether the current amount of remaining power satisfies a predetermined condition; and
if so, then obtaining first hardware parameter information of the first camera, and second hardware parameter information of the second camera, and
selecting one or more of the cameras according to the first hardware parameter information and the second hardware parameter information.

BRIEF DESCRIPTION OF THE DRAWINGS

In order to make the technical solutions according to some embodiments of the application more apparent, the drawings to which reference is made in the description of the embodiments will be described below in brief, and apparently the drawings described below illustrate some embodiments of the application, and those ordinarily skilled in the art can further derive other drawings from these drawings without any inventive effort. In the drawings:

FIG. 3 is a schematic flowchart of another method for controlling cameras according to some embodiments of the application;

FIG. 4 is a schematic flowchart of a process for setting a smart phone in a low-power control mode according to some embodiments of the application;

DETAILED DESCRIPTION OF THE EMBODIMENTS

In order to make the objects, technical solutions and advantages of the application more apparent, the application will be described below in further details with reference to other drawings, and apparently the embodiments as described are merely a part but not all of the embodiments of the application. All the other embodiments which can occur to those ordinarily skilled in the art from the embodiments here of the application without any inventive effort shall fall into the scope of the application as claimed.

Some embodiments of the application can be applicable to various terminals, such as terminals with multiple cameras. Some embodiments of the application can address such a problem that if a terminal equipped with multiple cameras has a low amount of charges in its battery and needs to take a photo, but if both of the cameras are enabled, then the amount of charge in the battery will be exhausted rapidly so that the terminal (e.g., cell phone) will be powered off. With some embodiments of the application, the terminal with a low amount of charges in the battery still can take a photo of a currently important scene using one or both of the cameras.

Figure 1:
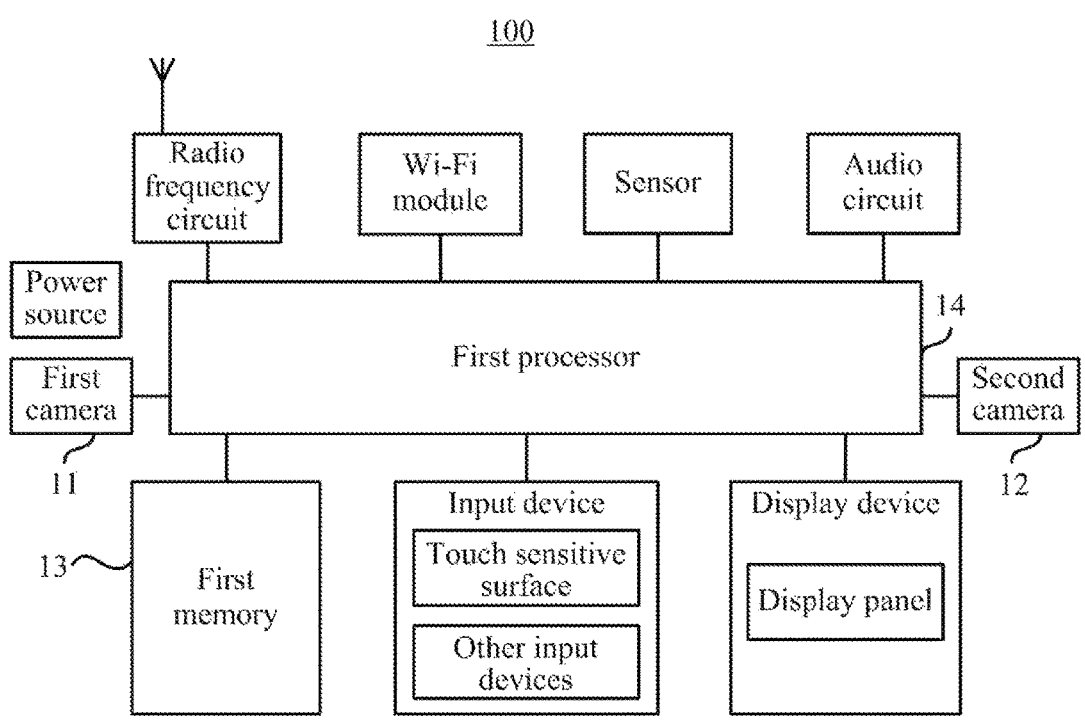
FIG. 1 is a schematic structural diagram of a terminal according to some embodiments of the application.

FIG. 1 illustrates a terminal 100, where the terminal 100 can be any one of various handheld devices (e.g., a cell phone, a tablet computer, a PDA, etc.), which can include a first processor 14 including one or more processing cores, a radio frequency circuit, a first memory 13 including one or more computer readable storage mediums, a first camera 11, a second camera 12, an input device, a display device, a sensor, an audio circuit, a WiFi module, a power source and other components. Those skilled in the art can appreciate that the structure of the terminal 100 in this embodiment will not be intended to be limiting, but can include more or fewer components or have some of the components combined or different components arranged, where:

The radio frequency circuit can be configured to receive and transmit a signal in the course of receiving and transmitting information or in communication, particularly by transferring downlink information of a base station to the first processor 14 for processing upon reception of the downlink information; and also transmitting uplink data to the base station. Typically the radio frequency circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover, the radio frequency circuit can further communicate with a network and another device through wireless communication. The wireless communication can comply with any of communication standards or protocols including but not limited to the GSM (Global System of Mobile communication), the GPRS (General Packet Radio Service), the CDMA (Code Division Multiple Access), the WCDMA (Wideband Code Division Multiple Access), the LTE (Long Term Evolution), an e-mail, the SMS (Short Messaging Service), etc.

The first memory 13 can be configured to store software programs and modules, and the first processor 14 is configured to run the software programs and modules stored in the first memory 13 to thereby perform various function applications and data processing. The first memory 13 can generally include a program storage area and a data storage area, where an operating system, applications required for at least one function (e.g., an audio playing function, an image playing function, etc.), etc., can be stored in the program storage area, and data created for use of the terminal 100 (e.g., audio data, an address book etc.), etc., can be stored in the data storage area. Moreover, the first memory 13 can include a high-speed random access memory and can further include a nonvolatile memory, e.g., at least one magnetic-disk memory device, a flash memory device, or another volatile solid memory device. Correspondingly, the first memory 13 can further include a memory controller configured to provide access of the first processor 14 and the input device to the first memory 13.

The input device can be configured to receive input digital or character information and to generate a keyboard, mouse, joystick, optical or track ball signal input related to user setting and function control. Particularly, the input device can include a touch sensitive surface and another input device. The touch sensitive surface, also referred to as a touch display screen or a touch control pad, can be configured to collect a touch operation by a user thereon or in proximity thereto (e.g., an operation by the user on or in proximity to the touch sensitive surface using his or her finger, a stylus or any other appropriate object or attachment) and to drive a corresponding connected device by preset program. Optionally, the touch sensitive surface can include two components which are a touch detection device and a touch controller, where the touch detection device detects the position of touching by the user and detects a signal as a result of the touch operation and transfers the signal to the touch controller, and the touch controller receives the touch signal from the touch detection device and converts it into coordinates of a touch point and further transfers them to the first processor 14 and can receive and execute a command sent by the first processor. Moreover, the touch sensitive surface can be embodied in various types of resistive, capacitive, infrared, surface sound wave and other types. The input device can further include another input device in addition to the touch sensitive surface. Particularly, the other input device can include but will not be limited to one or more of a physical keyboard, functional keys (e.g., volume control press keys, a power-on or-off press key, etc.), a track ball, a mouse, a joystick, etc.

The display device can be configured to display information input by the user or information provided to the user and various graphic user interfaces of the terminal 100, where these graphic user interfaces can be composed of graphics, texts, icons, videos, and any combination thereof. The display device can include a display panel which can be optionally configured in the form of a Liquid Crystal Display (LCD), an Organic Light-Emitting Diode (OLED) display, etc. Furthermore, the touch sensitive surface can overlie the display panel, and the touch sensitive surface, upon detection of the touch operation thereon or in proximity thereto, transfers the touch operation to the first processor to determine the type of the touch event, and thereafter the first processor provides a corresponding visual output on the display panel according to the type of the touch event. Although the touch sensitive surface and the display device are embodied in this embodiment as two separate components to perform the input and output functions, the touch sensitive surface and the display device can be integrated to perform the input and output functions in some embodiments.

The terminal 100 can further include at least one sensor, e.g., an optical sensor, a motion sensor, and other sensors. Particularly, the optical sensor can include an ambient optical sensor and a proximity sensor, where the ambient optical sensor can adjust the brightness of the display panel according to the luminosity of ambient light rays, and the proximity sensor can power off the display panel and/or a backlight when the terminal 100 moves in proximity to an ear. A gravity acceleration sensor which is a motion sensor can detect the magnitudes of accelerations in respective directions (typically three axes) and can detect the magnitude and the direction of gravity when the sensor is stationary and can be configured to perform applications of identifying the posture of a cell phone (e.g., switching between landscape and portrait modes, relevant games, calibration of the posture of a magnetometer, etc.), a relevant function of identifying vibration (e.g., a pedometer, a knock, etc.), etc.; and the terminal 100 can be further configured with a gyroscope, a barometer, a hygrometer, a thermometer, an infrared sensor and other sensors, and a repeated description of these components will be omitted herein.

The audio circuit, a speaker, and a transducer can provide an audio interface between the user and the terminal 100. The audio circuit can convert received audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the first processor 14 for processing and then transmitted to another apparatus, for example, through the radio frequency circuit, or the audio data is output to the first memory 13 for further processing. The audio circuit may further include an earphone jack for communication between a peripheral earphone and the terminal 100.

The WiFi falls into the category of short-range wireless transmission technologies, and the terminal 100 can assist the user in receiving and transmitting an e-mail, browsing a webpage, accessing streaming media, etc., through the WiFi module by which the user is provided with a wireless access to the broadband Internet.

The first processor 14 is a control component of the terminal 100, has the respective components connected by various interfaces and lines, and runs or executes the software programs and/or modules stored in the first memory 13 and invokes the data stored in the first memory to perform the various functions of the terminal 100 and process the data to thereby manage and control the terminal (e.g., cell phone) as a whole. Optionally, the first processor 14 can include one or more processing cores, and the first processor 14 can be integrated with an application processor and a modem processor, where the application processor generally handles the operating system, the user interfaces, the applications, etc., and the modem processor generally handles wireless communication. As can be appreciated, the modem processor above may not be integrated into the first processor.

The terminal 100 further includes a power source (e.g., a battery) powering the respective components, and the power source can be logically connected with the first processor 14 through a power management system to thereby perform charging and discharging management, power consumption management, etc., through the power management system. The power source can further include one or more DC or AC power sources, recharging systems, power source failure detection circuits, power source transformers or inverters, power source status indicators and any other components.

Figure 2:
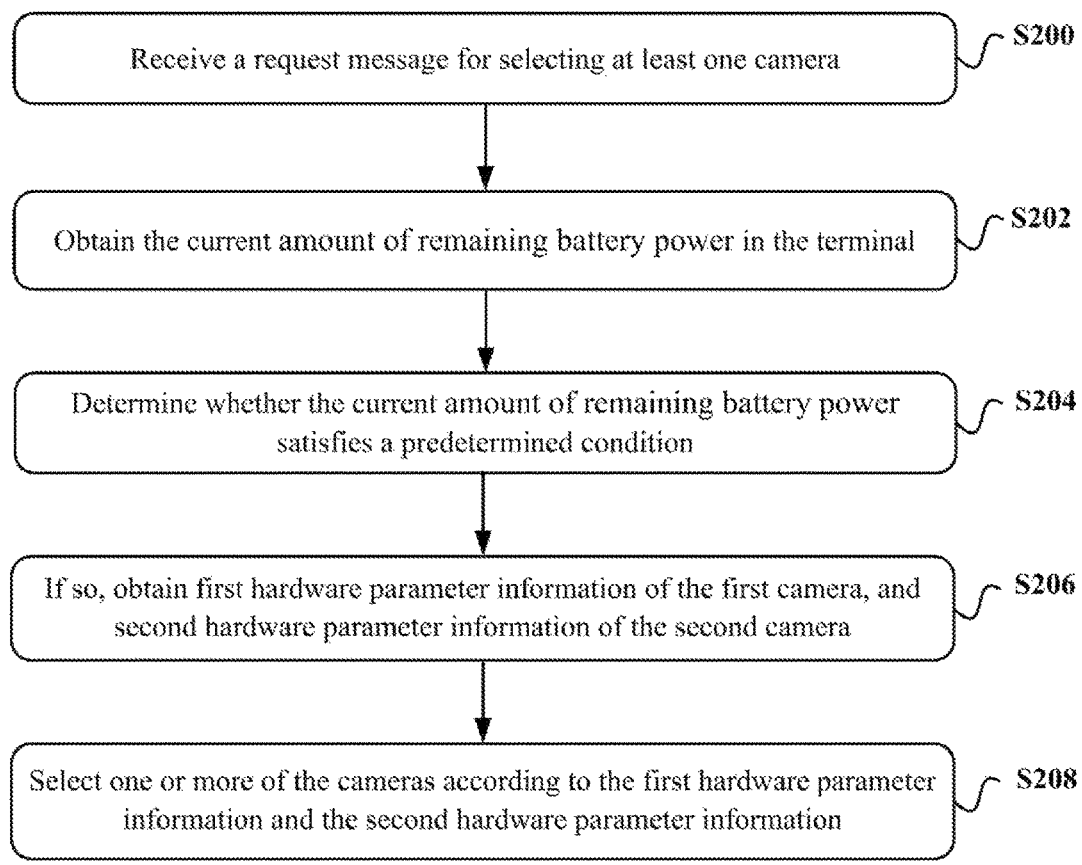
FIG. 2 is a schematic flowchart of a method for controlling cameras according to an embodiment of the application.

FIG. 2 illustrates a method for controlling cameras according to some embodiments of the application, which can be applicable to terminal 100 illustrated in FIG. 1, where the terminal includes at least a first camera and a second camera, and as illustrated in FIG. 2, the method includes the following steps:

The step S200 is to receive a request message for selecting at least one camera;

The step S202 is to obtain the current amount of remaining battery power in the terminal;

The step S204 is to determine whether the current amount of remaining battery power satisfies a predetermined condition, and if so, then the process proceeds to the step 206.

In some embodiments, the predetermined condition is being below a predetermined threshold, that is, if the current amount of remaining battery power is below the predetermined threshold, then the process proceeds to the step S206;

The step S206 is to obtain first hardware parameter information of the first camera, and second hardware parameter information of the second camera, and The step S208 is to select one or more of the cameras according to the first hardware parameter information and the second hardware parameter information.

The hardware parameter information refers to hardware parameter information of each of the cameras in the terminal, and the hardware parameter information of the cameras in the terminal can include sensor parameters of the cameras, pixels of the cameras, lens parameters of the cameras, etc., where the lens parameters can include a focal length, an angle of vision, an aperture, etc.

The predetermined condition can be being below the predetermined threshold, which can be determined under an actual condition, which can range between 0 and 1 (e.g., 15%, 20%, 30%, etc.), or which can be in the same unit as the amount of charge in a battery (for example, an amount of charge ranging between zero and full).

In some embodiments, the same type of hardware parameter information of the first camera and the second camera (e.g., pixel values) can be compared to determine the selected camera. In some embodiments, if the first hardware parameter information of the first camera is less than the second hardware parameter information of the second camera, then the first camera will be selected.

Firstly, it can be further determined whether the terminal is in a low-power control mode, before the step S206 is performed.

If a flag of the low-power control mode is a valid value, then the terminal will be in the low-power control mode. The flag of the low-power control mode can be set in a menu of the terminal. The flag has two options of "Yes" and "No", where if the option of the flag is "Yes", then the flag will be a valid value, and the terminal will be in the low-power control mode. Alternatively, the flag has some range of values, where if the value of the flag lies in some fixed range, then the flag will be a valid value, and the terminal will be in the low-power control mode. Here, the flag can reside in a driver layer of the terminal or in a partition in a memory of the terminal.

It shall be noted that computer readable program codes are stored in first memory 13 in terminal 100 illustrated in FIG. 1, and one or more processors can be configured to perform the computer readable program codes to perform the method for controlling cameras according to the embodiment of the application.

FIG. 3 illustrates a schematic flowchart of a method for controlling cameras according to some embodiments of the application, and as illustrated in FIG. 3, the flow can include:

The step 31 is to obtain the current amount of remaining power in a terminal upon reception of a request for enabling the dual cameras, and to determine whether the obtained amount of remaining power is below a preset threshold.

The step 32 is, if the obtained amount of remaining power is below the preset threshold, and the terminal is in a low-power control mode, to fetch hardware parameter information of the dual cameras, and to select and enable one of the dual cameras according to the fetched hardware parameter information; and if the obtained amount of remaining power is below the preset threshold, and the terminal is not in the low-power control mode, to enable both of the dual cameras.

In some embodiments, in the step 32 above, the numbers of pixels of the dual cameras are fetched respectively; and whether the numbers of pixels of the dual cameras are the same is determined, and if so, either of the dual cameras is selected and enabled; otherwise, one of the cameras with a smaller number of pixels is selected and enabled.

In some embodiments, in the step 32, if the amount of remaining power of the terminal is above the preset threshold, then both of the dual cameras are enabled.

In some embodiments, before the step 31, upon reception of an instruction sent by a user to instruct the terminal to enter the low-power control mode, the process sets a parameter, at a driver layer of the terminal and configured to indicate whether the terminal is in the low-power control mode, to a valid value; or upon reception of an instruction sent by a user to instruct the terminal to enter the low-power control mode, the process sets a flag, in a specified partition of a memory of the terminal and configured to indicate that the terminal is in the low-power control mode, to a valid value; and in the step 32 above, the process fetches the value of the parameter at the driver layer of the terminal and configured to indicate whether the terminal is in the low-power control mode, and determines whether the parameter is set to the valid value, and if so, then the terminal is in the low-power control mode; otherwise, the terminal is not in the low-power control mode; or the process fetches the value of the flag in the specified partition of the memory of the terminal and configured to indicate that the terminal is in the low-power control mode, and determines whether the parameter is set to the valid value, and if so, then the terminal is in the low-power control mode; otherwise, the terminal is not in the low-power control mode.

In some embodiments, display brightness of a display screen of the terminal is lowered subsequent to the step 32 above.

Some embodiments of the application will be described below, taking a smart phone with dual rear cameras as an example.

Some embodiments of the application may include two processes, that is, a process for setting the smart phone in the low-power control mode, and a process for controlling the dual cameras of the smart phone.

Firstly, the process for setting the smart phone in the low-power control mode in the embodiment of the application will be described below still taking the smart phone with the dual rear cameras as an example.

FIG. 4 illustrates a schematic flowchart of a process for setting a smart phone in a low-power control mode according to some embodiments of the application, and as illustrated in FIG. 4, the flow can include:

The step 41 is to receive the instruction sent by the user to instruct the smart phone to enter the low-power control mode.

In some embodiments, the terminal can be provided with a low-power control function in the embodiment of the application so that the user can decide whether to allow the terminal to enter the low-power control mode; and since the function can be an additional function of a camera, an option, i.e., an Enabled/Disabled control of the function, can be preset for the user.

In some embodiments, a menu item can be added to a setting menu of an application of the cameras, which can be referred to as a "low-power control mode" function. If the user decides to enable this function, then it will be determined that the terminal is in the low-power control mode; and if the user decides to disable this function, then it will be determined that the terminal is not in the low-power control mode.

That is, if the terminal satisfies a low-power control condition, that is, the terminal satisfies such a condition that the "low-power control mode" function is enabled, and the remaining amount of charges in the battery is below the preset threshold, then the low-power control function of the camera will be triggered. If the "low-power control mode" is disabled, then the "low-power control mode" function will not be disabled under any condition.

In some embodiments, of the application, if the "low-power control mode" function is not enabled, then the low-power control will not be triggered on any camera being operated by the user, no matter whether the amount of remaining power in the battery is above the preset threshold. If the "low-power control mode" function is enabled, then it will be determined whether the "low-power control condition" is satisfied, generally by fetching the current amount of charges in the battery of the device; and if the amount of charges in the battery is above or at the preset threshold, then the low-power control will not be triggered, and if the amount of charges in the battery is below the preset threshold, then the low-power control will be triggered while any camera is being operated by the user.

It shall be noted that some embodiments of the application will be described taking the preset threshold, which is 15% of the amount of the charges in the battery, merely as an example.

In a real application, the preset threshold can be set to any value, so a repeated description thereof will be omitted here.

The step 42 is to set the parameter, at the driver layer of the terminal and configured to indicate whether the terminal is in the low-power control mode, to the valid value; or to set the flag, in the specified partition of the memory of the terminal and configured to indicate that the terminal is in the low-power control mode, to the valid value.

In some embodiments, an upper layer of a terminal operating with the Android operating system needs to perform two steps: in a first step, the upper layer sends a low-power control state flag to the underlying driver, where the state flag can be sent in a number of ways, for example, through a SYS or PROC file system, or as a flag of a flag partition of the memory. The first step is performed to ensure that each of the dual cameras operates normally, that is, each of the dual cameras can display the display of underlying camera, and response to the request of the user. That is, if the terminal satisfies the condition for entering the low-power control mode (that is, the current amount of remaining power is below the preset threshold), then an upper-layer camera application will perform normal operation flows of the camera application, e.g., functions of previewing, taking a photo, taking a video, etc., in addition to sending the low-power flag to the underlying layer.

It shall be noted that some embodiments of the application has been described taking the two setting modes above (the driver layer parameter, and the specified partition of the memory (e.g., the flag partition)) merely as an example, but in a real application, whether the terminal is in the low-power control mode can be indicated in any applicable manner without departing from the scope of the application, so a repeated description thereof will be omitted here.

Subsequent to the process for setting the low-power control mode, the process for controlling the dual cameras of the smart phone in the embodiment of the application will be described in details still taking the smart phone with the dual rear cameras as an example.

Figure 5:
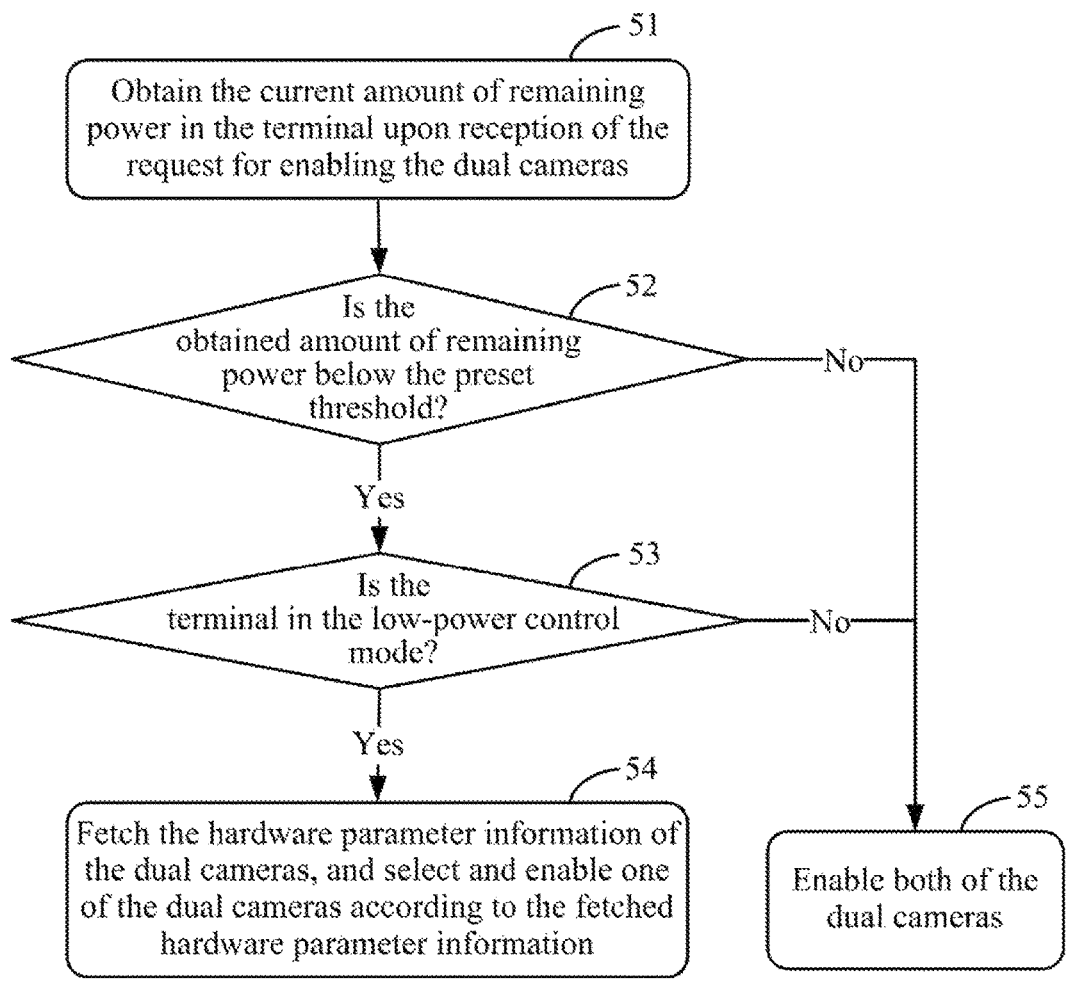
FIG. 5 is a schematic flowchart of a process for setting a smart phone in a low-power control mode according to some embodiments of the application.

FIG. 5 illustrates a schematic flowchart of a process for setting a smart phone in a low-power control mode according to some embodiments of the application, and as illustrated in FIG. 5, the flow can include:

The step 51 to the step 52 are to obtain the current amount of remaining power in the terminal upon reception of the request for enabling the dual cameras, to determine whether the obtained amount of remaining power is below the preset threshold, and if so, to proceed to the step 53; otherwise, to proceed to the step 55.

In some embodiments, if the lower-layer driver receives a request of the upper-layer application to enable the cameras, then the amount of charges in the battery will be firstly fetched, and whether the obtained amount of remaining power is below the preset threshold is determined. If the obtained amount of remaining power is below the preset threshold, then the flow proceeds to the step 53; otherwise, the flow proceeds to the step 55.

The step 53 is to further determine whether the terminal is in the low-power control mode if the obtained amount of remaining power is below the preset threshold, and if so, to proceed to the step 54; otherwise, to proceed to the step 55.

In some embodiments, the process fetches the value of the parameter at the driver layer of the terminal and configured to indicate whether the terminal is in the low-power control mode, and determines whether the parameter is set to the valid value, and if so, then the terminal is in the low-power control mode; otherwise, the terminal is not in the low-power control mode; or the process fetches the value of the flag in the specified partition of the memory of the terminal and configured to indicate that the terminal is in the low-power control mode, and determines whether the parameter is set to the valid value, and if so, then the terminal is in the low-power control mode; otherwise, the terminal is not in the low-power control mode.

The step 54 is to fetch the hardware parameter information of the dual cameras, and to select and enable one of the dual cameras according to the fetched hardware parameter information.

In some embodiments, the process determines whether the numbers of pixels of the dual cameras are the same, and if so, then the process selects and enables either of the dual cameras; otherwise, then the process selects and enables one of the cameras with a smaller number of pixels.

The step 55 is to enable both of the dual cameras.

By way of an example, some embodiments of the application will be described taking the preset threshold, which is 15% of the amount of charge in the battery, as an example. If the amount of charge in the battery of the terminal at this time is less than 15%, then the low-power control flag will be fetched, and it will be determined whether the flag is set to the valid value; and if the flag is set to the valid value, then the terminal will be controlled in the low-power control mode, that is, it will be determined whether the numbers of pixels of the dual cameras are the same, and if so, then either of the dual cameras will be selected and enabled; otherwise, one of the cameras with a smaller number of pixels will be selected and enabled. If the amount of charge in the battery of the terminal is less than 15%, and the low-power control flag is set to the invalid value, then the process will enter a normal camera flow, that is, both of the dual cameras will be enabled to take a photo.

It shall be noted that some embodiments of the application have been described taking the two determination modes above (the driver layer parameter, and the specified partition of the memory (e.g., the flag partition)) merely as an example, but in a real application, whether the terminal is in the low-power control mode can be indicated in any applicable manner without departing from the scope of the application, so a repeated description thereof will be omitted here.

Furthermore the hardware parameter information of the two cameras is detected.

By way of an example, the numbers of pixels, power consumption, or other related parameters of the two cameras can be detected in an embodiment of the application. The following description will be given taking detection of the numbers of pixels of the two cameras as an example.

It is determined whether the numbers of pixels of the dual cameras are the same, and if the numbers of pixels of the dual cameras are the same, then one of the cameras will be enabled (including power-on, clock and bus-controlled, etc.); and if the numbers of pixels of the dual cameras are different, then one of the dual cameras with a smaller number of pixels will be enabled.

Furthermore the display brightness of the display screen of the terminal can be further lowered subsequent to the steps above.

It shall be noted that the process for setting the smart phone in the low-power control mode and the process for controlling the dual cameras of the smart phone have been described in the embodiment of the application taking the terminal with the Android system merely as an example. The same principle will be applicable to terminals with other systems (e.g., IOS, Window Phone, etc.), so a repeated description thereof will be omitted herein.

As can be apparent from the technical solution above, the terminal can be provided with the lower-power control function in the embodiment of the application so that the user can decide whether to allow the terminal to enter the low-power control mode; and if the terminal in the low-power control mode receives the request for enabling the dual cameras (e.g., taking a photo, taking a video, or scanning a two-dimension code), then it will be firstly determined whether the amount of remaining power in the terminal is below the preset threshold, and if so, then it will be determined that the current amount of remaining power in the terminal is low, so it may not be appropriate to enable both of the dual cameras to take a photo; and in this case, with the low-power control function according to the embodiment of the application, the terminal selects and enables only one of the dual cameras so that the power consumption of the system can be lowered to thereby reduce the amount of consumed charge.

Figure 6:
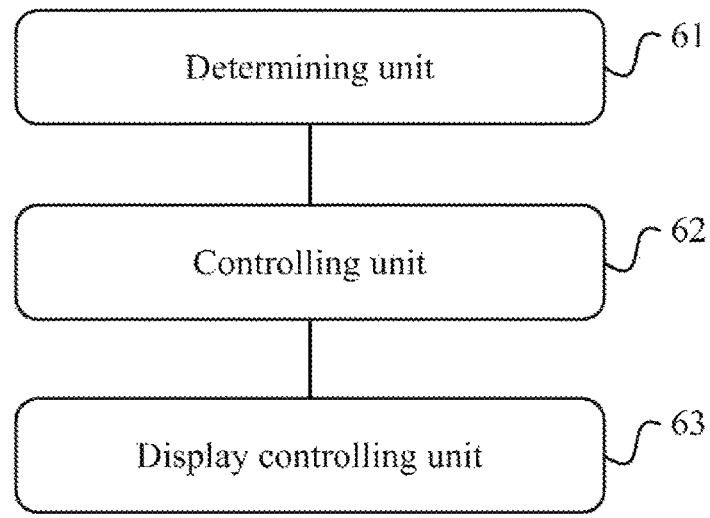
FIG. 6 is a schematic structural diagram of an apparatus for controlling cameras according to some embodiments of the application.

Based upon the same technical idea, an embodiment of the application further provides an apparatus for controlling dual cameras, and FIG. 6 illustrates a schematic structural diagram of an apparatus for controlling cameras according to an embodiment of the application, the apparatus including:

A determining unit 61 configured to obtain the current amount of remaining power in a terminal upon reception of a request for enabling the dual cameras, and to determine whether the obtained amount of remaining power is below a preset threshold.

A controlling unit 62 configured, if the obtained amount of remaining power is below the preset threshold, and the terminal is in a low-power control mode, to fetch hardware parameter information of the dual cameras, and to select and enable one of the dual cameras according to the fetched hardware parameter information; and if the obtained amount of remaining power is below the preset threshold, and the terminal is not in the low-power control mode, to enable both of the dual cameras.

In some embodiments, the controlling unit 62 is configured:

To fetch the numbers of pixels of the dual cameras respectively; and to determine whether the numbers of pixels of the dual cameras are the same, and if so, to select and enable either of the dual cameras; otherwise, to select and enable one of the cameras with a smaller number of pixels.

In some embodiments, the controlling unit 62 is configured:

If the amount of remaining power of the terminal is above the preset threshold, to enable both of the dual cameras.

In some embodiments, the apparatus further includes:

A determining unit 61 configured, upon reception of an instruction sent by a user to instruct the terminal to enter the low-power control mode, to set a parameter, at a driver layer of the terminal and configured to indicate whether the terminal is in the low-power control mode, to a valid value; or upon reception of an instruction sent by a user to instruct the terminal to enter the low-power control mode, to set a flag, in a specified partition of a memory of the terminal and configured to indicate that the terminal is in the low-power control mode, to a valid value; and The controlling unit 62 is configured: to fetch the value of the parameter at the driver layer of the terminal and configured to indicate whether the terminal is in the low-power control mode, to determine whether the parameter is set to the valid value, and if so, to determine that the terminal is in the low-power control mode; otherwise, to determine that the terminal is not in the low-power control mode; or to fetch the value of the flag in the specified partition of the memory of the terminal and configured to indicate that the terminal is in the low-power control mode, to determine whether the parameter is set to the valid value, and if so, to determine that the terminal is in the low-power control mode; otherwise, to determine that the terminal is not in the low-power control mode.

In some embodiments, the apparatus further includes:

A display controlling unit 63 configured to lower display brightness of a display screen of the terminal after one of the dual cameras is selected and enabled.

Figure 7:
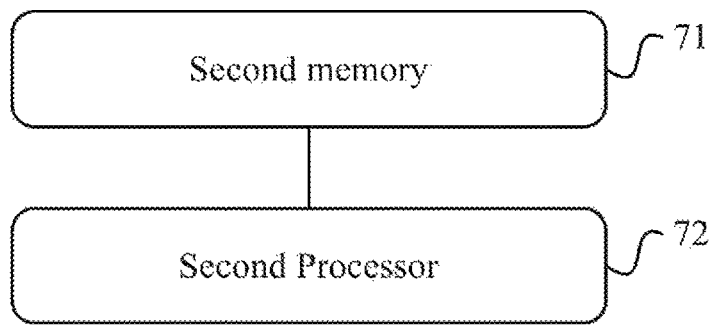
FIG. 7 is a schematic structural diagram of another apparatus for controlling cameras according to some embodiments of the application.

An embodiment of the application further provides another apparatus for controlling dual cameras, and FIG. 7 illustrates a schematic structural diagram of another apparatus for controlling cameras according to some embodiments of the application. As illustrated in FIG. 7, the apparatus includes:

A second memory 71 configured to store at least one instruction; and

A second processor 72 configured to execute the instruction stored in the second memory:

To obtain the current amount of remaining power in a terminal upon reception of a request for enabling the dual cameras, and to determine whether the obtained amount of remaining power is below a preset threshold; and If the obtained amount of remaining power is below the preset threshold, and the terminal is in a low-power control mode, to fetch hardware parameter information of the dual cameras, and to select and enable one of the dual cameras according to the fetched hardware parameter information; and if the obtained amount of remaining power is below the preset threshold, and the terminal is not in the low-power control mode, to enable both of the dual cameras.

In some embodiments, the second processor 72 configured to execute the instruction stored in the second memory to fetch the hardware parameter information of the dual cameras is configured to fetch the numbers of pixels of the dual cameras respectively; and The second processor 72 configured to select and enable the one of the dual cameras according to the obtained hardware parameter information is configured:

To determine whether the numbers of pixels of the dual cameras are the same, and if so, to select and enable either of the dual cameras; otherwise, to select and enable one of the cameras with a smaller number of pixels.

In some embodiments, the second processor 72 is configured to execute the instruction stored in the second memory:

If the amount of remaining power of the terminal is above the preset threshold, to enable both of the dual cameras.

In some embodiments, the second processor 72 is configured to execute the instruction stored in the second memory:

To enable the terminal to enter the low-power control mode as follows:

Upon reception of an instruction sent by a user to instruct the terminal to enter the low-power control mode, to set a parameter, at a driver layer of the terminal and configured to indicate whether the terminal is in the low-power control mode, to a valid value; or Upon reception of an instruction sent by a user to instruct the terminal to enter the low-power control mode, to set a flag, in a specified partition of a memory of the terminal and configured to indicate that the terminal is in the low-power control mode, to a valid value; and The second processor 72 configured to determine whether the terminal is in the low-power control mode is configured:

To fetch the value of the parameter at the driver layer of the terminal and configured to indicate whether the terminal is in the low-power control mode, to determine whether the parameter is set to the valid value, and if so, to determine that the terminal is in the low-power control mode; otherwise, to determine that the terminal is not in the low-power control mode; or To fetch the value of the flag in the specified partition of the memory of the terminal and configured to indicate that the terminal is in the low-power control mode, to determine whether the parameter is set to the valid value, and if so, to determine that the terminal is in the low-power control mode; otherwise, to determine that the terminal is not in the low-power control mode.

In some embodiments, the second processor 72 is configured to execute the instruction stored in the second memory:

To lower display brightness of a display screen of the terminal after the one of the dual cameras is selected and enabled.

Figure 8:
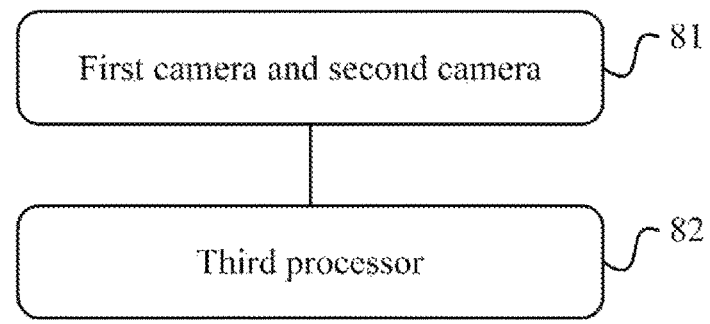
FIG. 8 is a schematic structural diagram of a terminal according to some embodiments of the application.

Based upon the same technical idea, an embodiment of the application further provides a terminal, and FIG. 8 illustrates a schematic structural diagram of a terminal according to an embodiment of the application. As illustrated in FIG. 8, the terminal includes:

Dual cameras 81 configured to be instructed by a third processor 82 to take an image; and The third processor 82 configured to obtain the current amount of remaining power in a terminal upon reception of a request for enabling the dual cameras, and to determine whether the obtained amount of remaining power is below a preset threshold; and if the obtained amount of remaining power is below the preset threshold, and the terminal is in a low-power control mode, to fetch hardware parameter information of the dual cameras, and to select and enable one of the dual cameras according to the fetched hardware parameter information, and if the obtained amount of remaining power is below the preset threshold, and the terminal is not in the low-power control mode, to enable both of the dual cameras.

The application has been described in a flowchart and/or a block diagram of the method, the device (system) and the computer program product according to the embodiments of the application. It shall be appreciated that respective flows and/or blocks in the flowchart and/or the block diagram and combinations of the flows and/or the blocks in the flowchart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flowchart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flowchart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flowchart and/or the block(s) of the block diagram.

Although some embodiments of the application have been described, those skilled in the art benefiting from the underlying inventive concept can make additional modifications and variations to these embodiments. Therefore, the appended claims are intended to be construed as encompassing some embodiments and all the modifications and variations coming into the scope of the application.

Evidently those skilled in the art can make various modifications and variations to the application without departing from the scope of the application. Thus, the application is also intended to encompass these modifications and variations thereto, so long as the modifications and variations come into the scope of the claims appended to the application and their equivalents.

The invention claimed is:

1. A method for controlling cameras of a terminal comprising dual rear cameras, the method comprising:
   upon receiving a request message for selecting at least one camera, determining whether a current amount of remaining power in the terminal is below a preset threshold;
   in response to determining that the current amount of remaining power is below the preset threshold and that the terminal is in a low-power control mode, obtaining first hardware parameter information of a first camera of the dual rear cameras, and second hardware parameter information of a second camera of the dual rear cameras; and
   selecting one or two of the dual rear cameras according to the first hardware parameter information and the second hardware parameter information.

2. The method according to claim 1, wherein each of the first hardware parameter information and the second hardware parameter information comprises a sensor parameter, a pixel value, and/or a lens parameter.

3. The method according to claim 1, wherein both the first hardware parameter information and the second hardware parameter information are pixel values, and if the first hardware parameter information is less than the second hardware parameter information, then the first camera is selected.

4. The method according to claim 1, wherein the determining that the terminal is in the low-power control mode comprises determining that a flag corresponding to the low-power control mode is a valid value.

5. The method according to claim 4, wherein the flag resides in a driver layer of the terminal or in a partition in a memory of the terminal.

6. A terminal comprising dual rear cameras, the terminal comprising:
   a memory storing computer readable program codes; and
   one or more processors configured to execute the computer readable program codes to perform a process comprising:
   upon receiving a request message for selecting at least one camera, determining whether a current amount of remaining power in the terminal is below a preset threshold;
   in response to determining that the current amount of remaining power is below the preset threshold and that the terminal is in a low-power control mode, obtaining first hardware parameter information of a first camera of the dual rear cameras, and second hardware parameter information of a second camera of dual rear cameras; and
   selecting one or two of the dual rear cameras according to the first hardware parameter information and the second hardware parameter information.

7. The terminal according to claim 6, wherein each of the first hardware parameter information and the second hardware parameter information comprises a sensor parameter, a pixel value, and a lens parameter.

8. The terminal according to claim 6, wherein both the first hardware parameter information and the second hardware parameter information are pixel values, and if the first hardware parameter information is less than the second hardware parameter information, then the first camera is selected.

9. The terminal according to claim 6, wherein the determining that the terminal is in the low-power control mode comprises determining that a flag corresponding to the low-power control mode is a valid value.

10. The terminal according to claim 9, wherein the flag resides in a driver layer of the terminal or in a partition in a memory of the terminal.

11. A non-transitory storage medium storing computer readable program codes to be executed by one or more processors to perform a process comprising:
    upon receiving a request message for selecting at least one camera of dual rear cameras in a terminal, determining whether a current amount of remaining power in the terminal is below a preset threshold;
    in response to determining that the current amount of remaining power is below the preset threshold and that the terminal is in a low-power control mode, obtaining first hardware parameter information of a first camera of the dual rear cameras, and second hardware parameter information of a second camera of the dual rear cameras; and selecting one or two of the dual rear cameras according to the first hardware parameter information and the second hardware parameter information.

12. The non-transitory storage medium according to claim 11, wherein each of the first hardware parameter information and the second hardware parameter information comprises a sensor parameter, a pixel value, and a lens parameter.

13. The non-transitory storage medium according to claim 11, wherein both the first hardware parameter information and the second hardware parameter information are pixel values, and if the first hardware parameter information is less than the second hardware parameter information, then the first camera is selected.

14. The non-transitory storage medium according to claim 13, wherein the determining that the terminal is in the low-power control mode comprises determining that a flag corresponding to the low-power control mode is a valid value.

15. The non-transitory storage medium according to claim 14, wherein the flag resides in a driver layer of the terminal or in a partition in a memory of the terminal.

* * * * *